United States Patent
Lin et al.

(10) Patent No.: US 10,262,197 B2
(45) Date of Patent: Apr. 16, 2019

(54) GESTURE-BASED OBJECT MEASUREMENT METHOD AND APPARATUS

(71) Applicant: Huawei Technologies Co., Ltd., Shenzhen (CN)

(72) Inventors: Yimin Lin, Shenzhen (CN); Shiguo Lian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 15/344,218

(22) Filed: Nov. 4, 2016

(65) Prior Publication Data
US 2017/0140216 A1  May 18, 2017

(30) Foreign Application Priority Data
Nov. 17, 2015  (CN) .......................... 2015 1 0790469

(51) Int. Cl.
*G06K 9/00* (2006.01)
*G06F 3/01* (2006.01)
(Continued)

(52) U.S. Cl.
CPC .......... *G06K 9/00355* (2013.01); *G01B 11/00* (2013.01); *G01B 11/026* (2013.01);
(Continued)

(58) Field of Classification Search
CPC ...... G06F 3/017; G06F 3/011; G06F 3/04815; G06F 3/0304; G06K 9/00355
(Continued)

(56) References Cited

U.S. PATENT DOCUMENTS 6,353,428 B1  3/2002  Maggioni et al.
6,827,579 B2  12/2004  Burdea et al.
(Continued)

FOREIGN PATENT DOCUMENTS

CN  101799717 A  8/2010
CN  101826129 A  9/2010
(Continued)

OTHER PUBLICATIONS

Foreign Communication From A Counterpart Application, European Application No. 16192311.5, European Office Action dated Apr. 5, 2018, 10 pages.
(Continued)

*Primary Examiner* — Charlotte M Baker
(74) *Attorney, Agent, or Firm* — Conley Rose, P.C.

(57) ABSTRACT

In the field of man-machine interaction technologies, a gesture-based object measurement method and apparatus, which are used to improve measurement efficiency. According to this method, after image information is collected, contour information of a to-be-measured object is automatically extracted and partitioned off, and a measurement parameter value such as a length, an area, or a volume is calculated on this basis. In this way, not only real-time online measurement is implemented, a measurement process is simpler, and more convenient, visual, and effective, and augmented reality (AR) measurement efficiency can be improved, but also the measurement process is more harmonious and natural, and closer to a human intention, and a measurement result is more accurate.

20 Claims, 10 Drawing Sheets

(51) Int. Cl.
G06K 9/46 (2006.01)
G06F 1/16 (2006.01)
G06F 3/03 (2006.01)
G01B 11/28 (2006.01)
G01B 11/00 (2006.01)
G01B 11/02 (2006.01)
G01B 11/03 (2006.01)
G01B 11/24 (2006.01)
G06T 7/73 (2017.01)

(52) U.S. Cl.
CPC .............. *G01B 11/03* (2013.01); *G01B 11/24* (2013.01); *G01B 11/285* (2013.01); *G06F 1/163* (2013.01); *G06F 3/011* (2013.01); *G06F 3/017* (2013.01); *G06F 3/0304* (2013.01); *G06K 9/4604* (2013.01); *G06T 7/74* (2017.01); *G01B 2210/58* (2013.01)

(58) Field of Classification Search
USPC ............... 382/103, 100; 345/8, 173; 33/506; 362/84, 145
See application file for complete search history.

(56) References Cited

U.S. PATENT DOCUMENTS

| | | | |
|---|---|---|---|
| 7,000,469 | B2 | 2/2006 | Foxlin et al. |
| 9,052,804 | B1 | 6/2015 | Starner et al. |
| 9,964,398 | B2* | 5/2018 | Becker .............. G01B 11/005 |
| 2011/0035952 | A1 | 2/2011 | Roithmeier |
| 2013/0141326 | A1 | 6/2013 | Liou et al. |
| 2013/0336528 | A1 | 12/2013 | Itani et al. |
| 2014/0002806 | A1 | 1/2014 | Buchel |
| 2014/0125577 | A1 | 5/2014 | Hoang et al. |
| 2015/0035963 | A1 | 2/2015 | Kirschner et al. |
| 2015/0097719 | A1 | 4/2015 | Balachandreswaran et al. |
| 2016/0026253 | A1* | 1/2016 | Bradski .............. G02B 27/225 345/8 |
| 2016/0086322 | A1 | 3/2016 | Arita et al. |
| 2017/0094179 | A1* | 3/2017 | Bellamy ............ G06K 9/00355 |
| 2017/0140216 | A1 | 5/2017 | Lin et al. |

FOREIGN PATENT DOCUMENTS

| | | |
|---|---|---|
| CN | 201689383 U | 12/2010 |
| CN | 101959322 A | 1/2011 |
| CN | 102016756 A | 4/2011 |
| CN | 102607423 A | 7/2012 |
| CN | 102857633 A | 1/2013 |
| CN | 102891915 A | 1/2013 |
| CN | 103017693 A | 4/2013 |
| CN | 103135757 A | 6/2013 |
| CN | 103167079 A | 6/2013 |
| CN | 101833115 B | 7/2013 |
| CN | 103398696 A | 11/2013 |
| CN | 103430042 A | 12/2013 |
| CN | 103591894 A | 2/2014 |
| CN | 103595856 A | 2/2014 |
| CN | 103759701 A | 4/2014 |
| CN | 104007817 A | 8/2014 |
| CN | 104063039 A | 9/2014 |
| CN | 104216506 A | 12/2014 |
| CN | 104460951 A | 3/2015 |
| CN | 104484053 A | 4/2015 |
| CN | 104596419 A | 5/2015 |
| CN | 104750969 A | 7/2015 |
| CN | 105027031 A | 11/2015 |
| CN | 106705837 A | 5/2017 |
| EP | 1031942 A2 | 8/2000 |
| EP | 2770783 A2 | 8/2014 |
| JP | 2005293291 | 10/2005 |
| WO | 2013032041 A1 | 3/2013 |
| WO | 2014181725 A1 | 11/2014 |

OTHER PUBLICATIONS

Machine Translation and Abstract of Chinese Publication No. CN101799717, dated Aug. 11, 2010, 10 pages.
Machine Translation and Abstract of Chinese Publication No. CN101826129, dated Sep. 8, 2010, 10 pages.
Machine Translation and Abstract of Chinese Publication No. CN101833115, dated Jul. 3, 2013, 12 pages.
Machine Translation and Abstract of Chinese Publication No. CN101959322, dated Jan. 26, 2011, 7 pages.
Machine Translation and Abstract of Chinese Publication No. CN102857633, dated Jan. 2, 2013, 6 pages.
Machine Translation and Abstract of Chinese Publication No. CN102891915, dated Jan. 23, 2013, 10 pages.
Machine Translation and Abstract of Chinese Publication No. CN103017693, dated Apr. 3, 2013, 11 pages.
Translation and Abstract of Chinese Publication No. CN103167079, dated Jun. 19, 2013, 7 pages.
Translation and Abstract of Chinese Publication No. CN103398696, dated Nov. 20, 2013, 15 pages.
Translation and Abstract of Chinese Publication No. CN103591894, dated Feb. 19, 2014, 6 pages.
Translation and Abstract of Chinese Publication No. CN103595856, dated Feb. 19, 2014, 4 pages.
Translation and Abstract of Chinese Publication No. CN103759701, dated Apr. 30, 2014, 8 pages.
Translation and Abstract of Chinese Publication No. CN104063039, dated Sep. 24, 2014, 6 pages.
Translation and Abstract of Chinese Publication No. CN104460951, dated Mar. 25, 2015, 10 pages.
Translation and Abstract of Chinese Publication No. CN104596419, dated May 6, 2015, 11 pages.
Translation and Abstract of Chinese Publication No. CN104750969, dated Jul. 1, 2015, 29 pages.
Translation and Abstract of Chinese Publication No. CN201689383, dated Dec. 29, 2010, 7 pages.
Translation and Abstract of European Publication No. WO2013032041, dated Mar. 7, 2013, 90 pages.
Inac, O., et al., "A 90-100-GHz Phased-Array Transmit/Receive Silicon RFIC Module With Built-In Self-Test" IEEE Transactions on Microwave Theory and Techniques, vol. 61, No. 10, Oct. 2013. pp. 3774-3782.
Sturm, J., et al., "A Benchmark for the Evaluation of RGB-D SLAM Systems," IEEE/RSJ International Conference on Intelligent Robots and Systems, Oct. 7-12, 2012, pp. 573-580.
Dhome, M., et al., "Monocular Vision Based SLAM for Mobile Robots," ResearchGate, Aug. 2006, 6 pages.
Klein, G., et al., "Parallel Tracking and Mapping for Small AR Workspaces," 2007, 10 pages.
Lemaire, T., et al., "Vision-Based SLAM: Stereo and Monocular Approaches," International Journal of Computer Vision, vol. 74, No. 3, 2007, pp. 343-364.
Foreign Communication From A Counterpart Application, European Application No. 16192311.5, Partial European Search Report dated Apr. 28, 2017, 11 pages.
Foreign Communication From A Counterpart Application, European Application No. 16192311.5, Extended European Search Report dated Jul. 14, 2017, 11 pages.
Machine Translation and Abstract of Chinese Publication No. CN104216506, dated Dec. 17, 2014, 53 pages.
Machine Translation and Abstract of Chinese Publication No. CN105027031, dated Nov. 4, 2015, 18 pages.
Foreign Communication From A Counterpart Application, Chinese Application No. 201510790469.4, Chinese Office Action dated Sep. 30, 2018, 11 pages.

\* cited by examiner

GESTURE-BASED OBJECT MEASUREMENT METHOD AND APPARATUS

CROSS-REFERENCE TO RELATED APPLICATION

This application claims priority to Chinese Patent Application No. 201510790469.4, filed on Nov. 17, 2015, which is hereby incorporated by reference in its entirety.

TECHNICAL FIELD

The present disclosure relates to the field of man-machine interaction technologies, and in particular, to a gesture-based object measurement method and apparatus.

BACKGROUND

An augmented reality (AR) technology is a technology that seamlessly integrates real world information and virtual world information, and applies the virtual world information to a real world by using sciences and technologies such as sensing, calculation, and graphics.

In production and life, a distance, a length, an area, a volume, and the like of an object in the real world usually need to be measured. If a conventional method is used, a professional measuring tool needs to be carried to perform manual measurement, and measurement data needs to be recorded manually. It may be seen that an operation process of this measurement method is complicated and also low-efficiency.

In the prior art, the AR technology is introduced to measure an object. For example, in an AR measurement method, a user manually controls a camera to collect an image of a to-be-measured object, and a picture is static after a measurement mode is entered. The user taps a screen to select to-be-measured points, and a measurement result such as a distance or a length between the to-be-measured points is output on the screen. This AR measurement method is an off-line measurement method.

For another example, in another AR measurement method, a user fastens a measurement apparatus on the head, and the user may see a real-time picture by using a video stream that is input to the measurement apparatus. A to-be-measured point is always at a central position of a picture, and the user needs to move the head to position a to-be-measured point and needs to click an OK button on an additional auxiliary device to perform measurement and output a measurement result.

As can be seen from this, an operation process of the AR measurement method in the prior art is still complicated, real-time measurement cannot be implemented, operation efficiency is low, and AR measurement cannot be implemented in a more harmonious and natural man-machine interaction manner.

SUMMARY

Embodiments of the present disclosure provide a gesture-based object measurement method and apparatus, so as to resolve a problem in the prior art that an operation process of AR measurement is complicated, real-time measurement cannot be implemented, operation efficiency is low, and AR measurement cannot be implemented in a more harmonious and natural man-machine interaction manner.

Specific technical solutions provided in the embodiments of the present disclosure are as follows:

According to a first aspect, a gesture-based object measurement method is provided, including: collecting image information of a to-be-measured object; collecting information about a gesture; when the gesture meets a set condition, determining a measurement positioning point of the to-be-measured object according to the gesture; obtaining three-dimensional coordinate values obtained after the measurement positioning point is mapped to three-dimensional space; determining a measurement parameter of the to-be-measured object; and calculating a value of the measurement parameter of the to-be-measured object according to the measurement parameter and the three-dimensional coordinate values.

With reference to the first aspect, in a first possible implementation manner of the first aspect, the determining a measurement parameter of the to-be-measured object includes: determining a gesture type of the gesture; and searching a preset correspondence between a gesture type and a measurement parameter for a measurement parameter corresponding to the determined gesture type, and using the measurement parameter as the measurement parameter of the to-be-measured object.

With reference to the first aspect or the first possible implementation manner of the first aspect, in a second possible implementation manner of the first aspect, that the gesture meets a set condition includes duration during which the gesture is located at a relative position in the image information exceeds a preset duration threshold.

With reference to any one of the first aspect, or the first to the second possible implementation manners of the first aspect, in a third possible implementation manner of the first aspect, the parameter includes at least one of a length, an area, a volume, or a distance to an image information collection device.

According to a second aspect, a gesture-based object measurement method is provided, including: collecting image information of a to-be-measured object; extracting contour information of the to-be-measured object from the collected image information; collecting information about a gesture; when the gesture meets a set condition, determining, according to the gesture, a target measurement area that is in the image information and in which the user is interested; partitioning contour information of the target measurement area off the extracted contour information; obtaining three-dimensional coordinate values obtained after each endpoint included in the partitioned-off contour information is mapped to three-dimensional space; and calculating, according to the obtained three-dimensional coordinate values, a measurement parameter value of the to-be-measured object corresponding to the contour information of the target measurement area.

With reference to the second aspect, in a first possible implementation manner of the second aspect, that the gesture meets a set condition includes: duration during which the gesture is located at a relative position in the image information exceeds a preset duration threshold; or a distance of translating, by the gesture, in a direction perpendicular to a two-dimensional plane to which the image information is mapped exceeds a set step, where a relative position of the gesture remains unchanged in the translation process on the two-dimensional plane to which the image information is mapped.

With reference to the second aspect or the first possible implementation manner of the second aspect, in a second possible implementation manner of the second aspect, the measurement parameter value includes at least one of a length value, an area value, a volume value, or a distance to an image information collection device.

According to a third aspect, a gesture-based object measurement apparatus is provided, including a sensor, a processor, a transceiver, and a display, where: the sensor is configured to collect image information of a to-be-measured object, and collect information about a gesture; the processor is configured to read a set of programs so as to execute the following process: when the gesture collected by the sensor meets a set condition, determining a measurement positioning point of the to-be-measured object according to the gesture; obtaining three-dimensional coordinate values obtained after the measurement positioning point is mapped to three-dimensional space; determining a measurement parameter of the to-be-measured object; and calculating a value of the measurement parameter of the to-be-measured object according to the measurement parameter and the three-dimensional coordinate values; the transceiver is configured to send the value, obtained by means of calculation by the processor, of the measurement parameter to the display; and the display is configured to display the received parameter value.

With reference to the third aspect, in a first possible implementation manner of the third aspect, the processor is specifically configured to: determine a gesture type of the gesture; and search a preset correspondence between a gesture type and a measurement parameter for a measurement parameter corresponding to the determined gesture type, and use the measurement parameter as the measurement parameter of the to-be-measured object.

With reference to the third aspect or the first possible implementation manner of the third aspect, in a second possible implementation manner of the third aspect, that the gesture meets a set condition includes duration during which the gesture is located at a relative position in the image information exceeds a preset duration threshold.

With reference to any one of the third aspect, or the first to the second possible implementation manners of the third aspect, in a third possible implementation manner of the third aspect, the apparatus further includes a memory, configured to store the programs executed by the processor.

With reference to any one of the third aspect, or the first to the third possible implementation manners of the third aspect, in a fourth possible implementation manner of the third aspect, the parameter includes at least one of a length, an area, a volume, or a distance to an image information collection device.

According to a fourth aspect, a gesture-based object measurement apparatus is provided, including a sensor, a processor, a transceiver, and a display, where: the sensor is configured to collect image information of a to-be-measured object, and collect information about a gesture; the processor is configured to read a set of programs so as to execute the following process: extracting contour information of the to-be-measured object from the image information collected by the sensor; when the gesture collected by the sensor meets a set condition, determining, according to the gesture, a target measurement area that is in the image information and in which the user is interested; partitioning contour information of the target measurement area off the extracted contour information; obtaining three-dimensional coordinate values obtained after each endpoint included in the partitioned-off contour information is mapped to three-dimensional space; and calculating, according to the obtained three-dimensional coordinate values, a measurement parameter value of the to-be-measured object corresponding to the contour information of the target measurement area; the transceiver is configured to send the measurement parameter value obtained by means of calculation by the processor to the display; and the display is configured to display the received measurement parameter value.

With reference to the fourth aspect, in a first possible implementation manner of the fourth aspect, that the gesture meets a set condition includes: duration during which the gesture is located at a relative position in the image information exceeds a preset duration threshold; or a distance of translating, by the gesture, in a direction perpendicular to a two-dimensional plane to which the image information is mapped exceeds a set step, where a relative position of the gesture remains unchanged in the translation process on the two-dimensional plane to which the image information is mapped.

With reference to the fourth aspect or the first possible implementation manner of the fourth aspect, in a second possible implementation manner of the fourth aspect, the apparatus further includes a memory, configured to store the programs executed by the processor.

With reference to the fourth aspect, the first or the second possible implementation manner of the fourth aspect, in a third possible implementation manner of the second aspect, the measurement parameter value includes at least one of a length value, an area value, a volume value, or a distance to an image information collection device.

In the present application, after image information is collected, contour information of a to-be-measured object is automatically extracted and partitioned off, and a measurement parameter value such as a length, an area, or a volume is calculated on this basis. In this way, not only real-time online measurement is implemented, a measurement process is simpler, and more convenient, visual, and effective, and AR measurement efficiency is improved, but also the measurement process is more harmonious and natural, and closer to a human intention, and a measurement result is more accurate.

DESCRIPTION OF EMBODIMENTS

In view of a problem in the prior art that operation efficiency of AR measurement is low and real-time online measurement cannot be implemented, the present application provides a gesture-based object measurement method and apparatus, in which a gesture is used to interactively perform the AR measurement, so as to improve AR measurement efficiency and implement the real-time online measurement, so that an operation process is more visual and effective, a measurement process is more harmonious and natural, and closer to a human intention, and a measurement result is more accurate.

To make the objectives, technical solutions, and advantages of the present application clearer, the following further describes the present application in detail with reference to the accompanying drawings. Apparently, the described embodiments are merely some but not all of the embodiments of the present application. All other embodiments obtained by persons of ordinary skill in the art based on the embodiments of the present application without creative efforts shall fall within the protection scope of the present application.

The AR measurement described in the present application is measurement of a distance, a length, an area, a volume, and the like of an environment and an object based on an AR technology, and may be applied to production and life. For example, the AR measurement is applied to measurement of a goods dimension or the like during a logistics goods placing process, and measurement of a dimension of furniture or the like during home design. The AR technology is to apply virtual information to a real world by using sciences and technologies such as sensing, calculation, and graphics.

Figure 1:
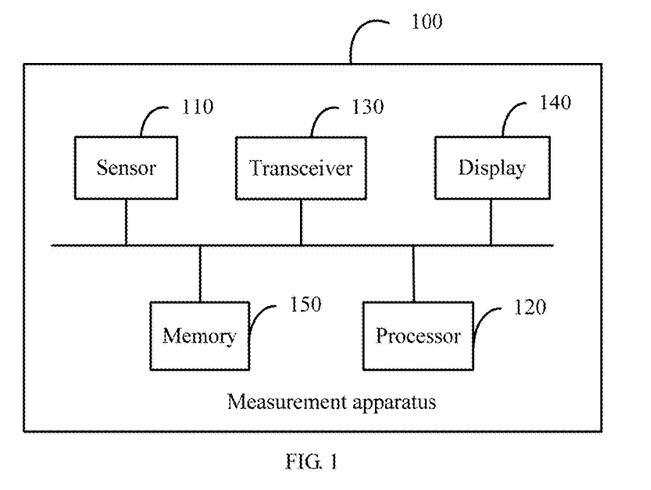
FIG. 1 is a structural diagram of a measurement apparatus according to the present application.

As shown in FIG. 1, the present application provides a measurement apparatus used for the AR measurement, which is configured to execute methods involved in the subsequent embodiments.

Referring to FIG. 1, a measurement apparatus 100 provided in the present application includes a sensor 110, a processor 120, a transceiver 130, and a display 140, where the sensor 110, the processor 120, the transceiver 130, and the display 140 are connected in a wired or wireless manner. The wireless manner includes but is not limited to one of or any combination of several of WiFi®, Bluetooth®, ZigBee®. Preferably, the measurement apparatus 100 further includes a memory 150, where the memory 150 is configured to store a set of programs.

The sensor 110 is configured to collect image information and gesture information.

The image information refers to red green blue (RGB) color standard image information. The sensor 110 may use a monocular camera, a stereoscopic visual camera, or an RGB color and depth (RGB-Depth or RGB-D) camera to shoot a video stream in real time. Optionally, the stereoscopic vision camera uses a visual system that includes a binocular camera. The monocular camera may directly collect the RGB image information, one way of the binocular camera may be used to collect the RGB image information, and the RGB-D camera may directly collect an RGB image.

The processor 120 is configured to execute the programs stored in the memory 150, and is specifically configured to obtain a calculation result by performing a process such as processing, analysis, and calculation on the collected information, and output an obtained result to the display 140 by using the transceiver 130.

The display 140 is configured to display the result output by the processor 120, and present the result to a user.

In the present application, the sensor 110, the processor 120, the transceiver 130, and the display 140 may be all disposed in a same device, where the device may be but not limited to a mobile device such as a mobile phone or a tablet computer, or a wearable device such as AR glasses; or may be separately disposed in different devices, which is not limited in the present application.

Figure 2:
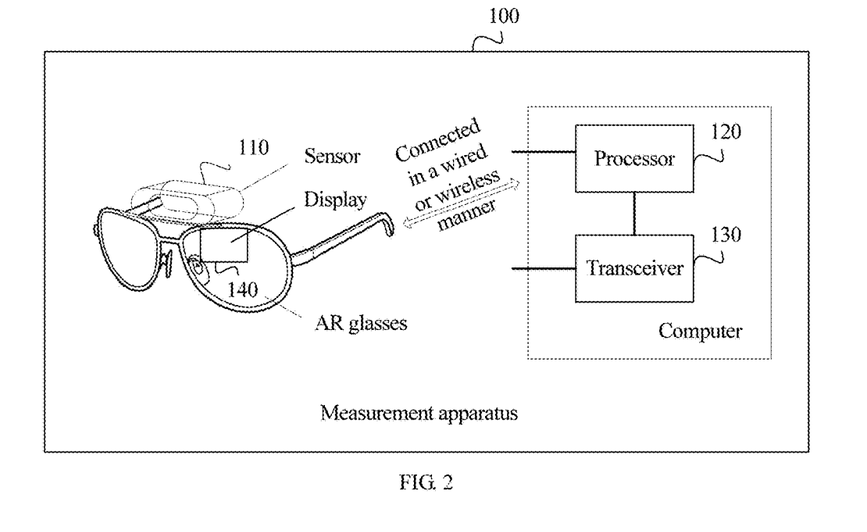
FIG. 2 is an example diagram of a measurement apparatus according to the present application.

As shown in FIG. 2, the AR glasses are used as an example. The sensor 110 may be independently disposed in a visual sensor device, and the visual sensor device is fastened on a leg of the AR glasses, and is connected to the AR glasses in a wired or wireless manner. The processor 120 and the transceiver 130 are disposed in a computer, and the computer may be in the AR glasses, or may be disposed independent of the AR glasses, and is connected to the AR glasses in a wired or wireless manner. As shown in FIG. 2, that the computer is disposed independent of the AR glasses is used as an example. The display 140 is in the AR glasses and is configured to present enhanced information, that is, configured to display a processing result.

Based on the measurement apparatus 100 shown in FIG. 1, the present application provides embodiments of two gesture-based object measurement methods: Embodiment 1 and Embodiment 2 as described below. The following provides a detailed description with reference to the accompanying drawings.

Embodiment 1

Figure 3:
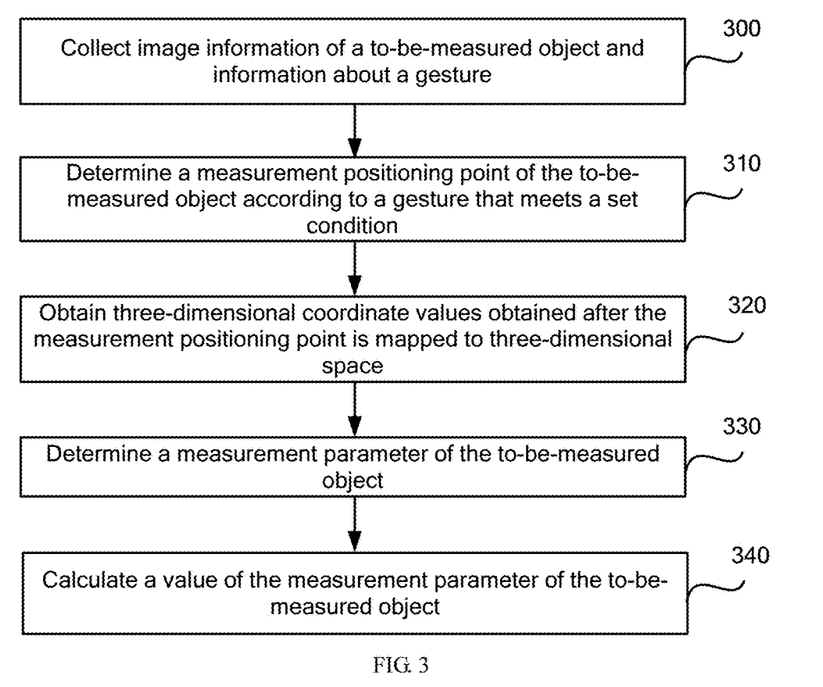
FIG. 3 is a flowchart of a measurement method according to Embodiment 1 of the present application.

Embodiment 1 of the present application provides a gesture-based object measurement method. As shown in FIG. 3, steps of the method include:

Step 300: Collect image information of a to-be-measured object and information about a gesture.

The collected information in this step is image information obtained from a video stream shot in real time by using a camera in a sensor, and is dynamic information.

In an actual application, a sensor shoots a video stream of a scenario in which a user is interested, and after determining an approximate position for shooting, the sensor continues to shoot information about a gesture presented by the user, where the gesture refers to an action that is made by the user by using a finger and that has a specific measurement meaning. That is, according to different measurement purposes, the to-be-measured object has multiple measurement parameters. For example, a measurement parameter may be at least one of a length, a width, a height, an area, a volume of the to-be-measured object, or a distance from the to-be-measured object to an image information collection device. Gestures may be classified into different gesture types according to different actions that may be made by a finger of the user.

To enable a measurement apparatus to correctly identify a gesture, before measurement starts, correspondences between different gesture types and different measurement parameters are preset. Table 1 shows an example of setting the correspondences between different gesture types and measurement parameters.

TABLE 1

| Measurement parameter | Gesture type |
|---|---|
| Distance | |
| Length |  |
| Area | |

Step 310: When a collected gesture in step 300 meets a set condition, determine a measurement positioning point of the to-be-measured object according to a gesture that meets the set condition.

The information about the gesture can be detected by detecting the collected image information. Because the gesture is gesticulated by the user by using a finger, a gesture initially detected may not indicate real intention of the user and cannot be used as a basis for the measurement. Only when the gesture meets the set condition, the gesture that meets the set condition is used as a basis for subsequent measurement.

The set condition may be duration during which the gesture is located at a relative position in the image information exceeds a preset duration threshold. For example, the preset duration threshold is 3 seconds (s).

A preset measurement key point is determined on the gesture that meets the set condition, where the measurement key point is a point that is on the gesture and that is used to be mapped to the measurement positioning point of the to-be-measured object in the image information. For example, as shown in Table 1, when the measurement parameter is a distance, a measurement key point on a gesture is a vertex position of a right index finger; when the measurement parameter is an area, measurement key points on a gesture are positions of four vertexes of a rectangle area gesticulated by two hands.

The determined measurement key points are separately mapped to the to-be-measured object included in the image information, so as to obtain measurement positioning points of the to-be-measured object.

Step 320: Obtain three-dimensional coordinate values obtained after the measurement positioning point is mapped to three-dimensional space.

The obtained three-dimensional coordinate values are coordinate values obtained after the measurement positioning point is mapped to a three-dimensional space coordinate system. There is at least one measurement positioning point, and a quantity of the measurement positioning point varies according to different gesture types.

Figure 4A:
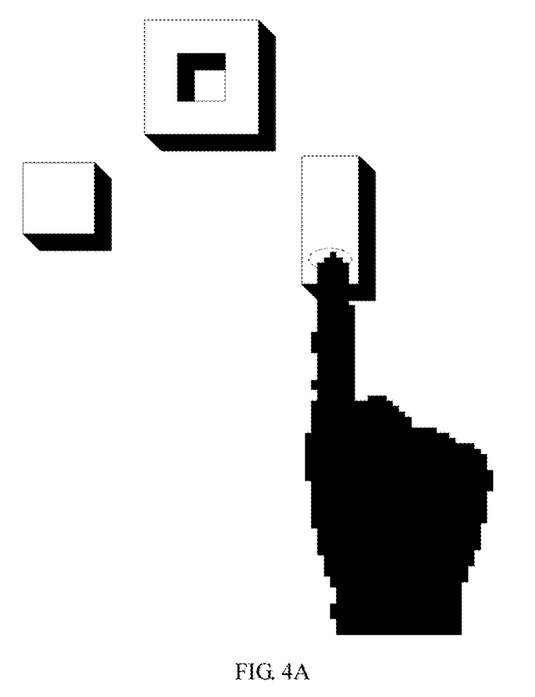
FIG. 4A and FIG. 4B are schematic diagrams of collecting image information according to the present application.

As shown in FIG. 4A, it is assumed that the collected image information is image information in a scenario shown in FIG. 4A, and the key point, on the gesture, determined in step 310 is the vertex position of the right index finger, the vertex position is mapped to the to-be-measured object included in the image information. It may be learned from the figure that the to-be-measured object is a cuboid object, and an obtained point that is on the cuboid object and that is circled by a dotted line is the measurement positioning point. The three-dimensional coordinate values obtained after the measurement positioning point is mapped to the three-dimensional space are obtained.

Figure 4B:
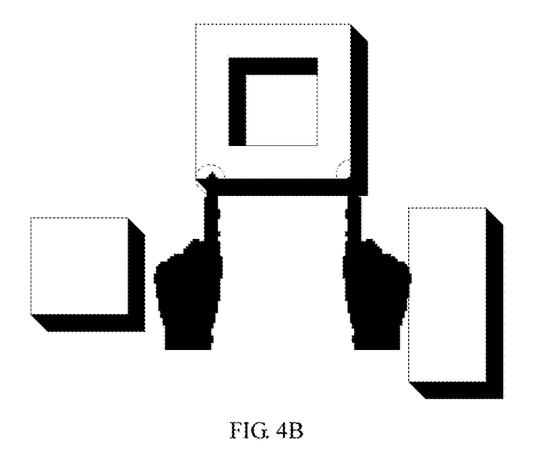

As shown in FIG. 4B, it is assumed that the collected image information is image information in a scenario shown in FIG. 4B, and determined key points on the gesture in step 310 are vertex positions of a left and a right index finger, the two vertex positions are mapped to the to-be-measured object included in the image information. It may be learned from the figure that the to-be-measured object is a hollow cube object, and obtained points that are on the hollow cube object and that are circled by a dotted line are two measurement positioning points. The three-dimensional coordinate values obtained after the two measurement positioning points are mapped to the three-dimensional space are obtained.

The following uses that a measurement apparatus 100 includes AR glasses as an example to describe step 310 and step 320. Image information and gesture information that are collected by a sensor 110, and a final measurement result are all displayed on the AR glasses for the user to view. The measurement process includes man-machine interaction. Based on structures of left and right eyes of a user, relative positions of the gesture that are in the image information in left and right areas of the AR glasses are different. In the present application, two browsing manners are designed: monocular browsing and binocular browsing. As the name implies, the monocular browsing is the user closes one eye and views a picture displayed on the AR glasses by using the other eye. That a picture viewed by the left eye is used as a reference is used as an example for description in the present application.

Figure 5A:
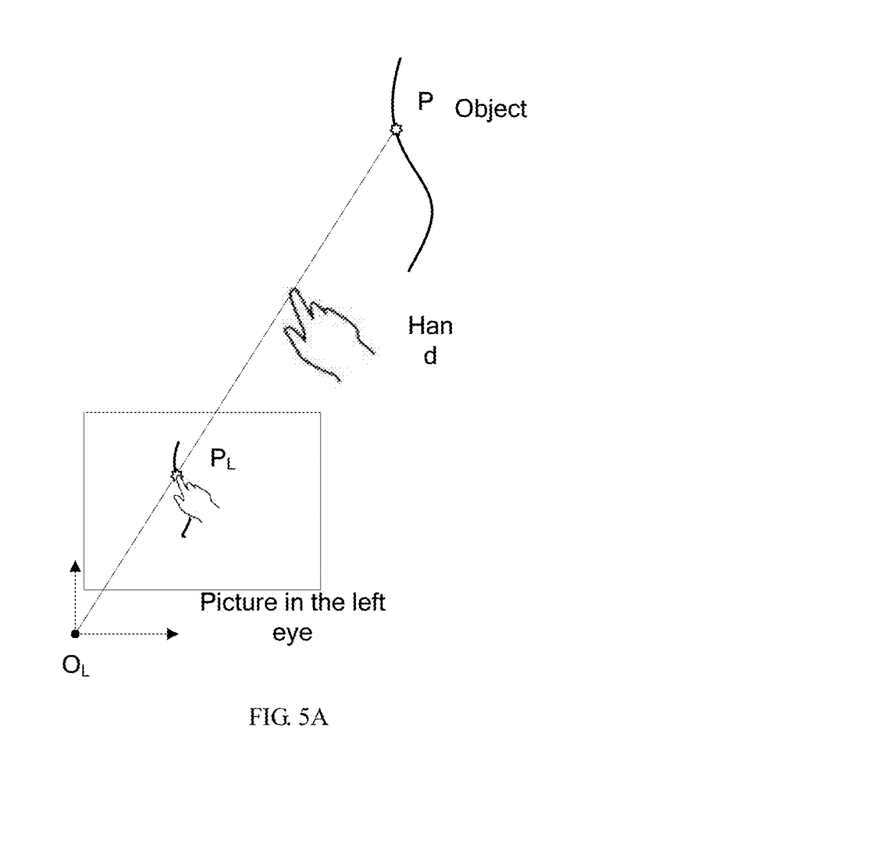
FIG. 5A and FIG. 5B are schematic diagrams of a monocular browsing manner and a binocular browsing manner according to the present application.

As shown in FIG. 5A, if a monocular (that is, a left eye) browsing manner is selected, a processor 120 directly maps a key point on a gesture collected by the sensor 110 to the to-be-measured object in the image information, obtains a measurement positioning point $P_L$, and obtains three-dimensional coordinate values (x, y, z) of a corresponding point P obtained after the measurement positioning point $P_L$ is mapped to the three-dimensional space, which are used for subsequent calculation of a measurement parameter value.

Figure 5B:
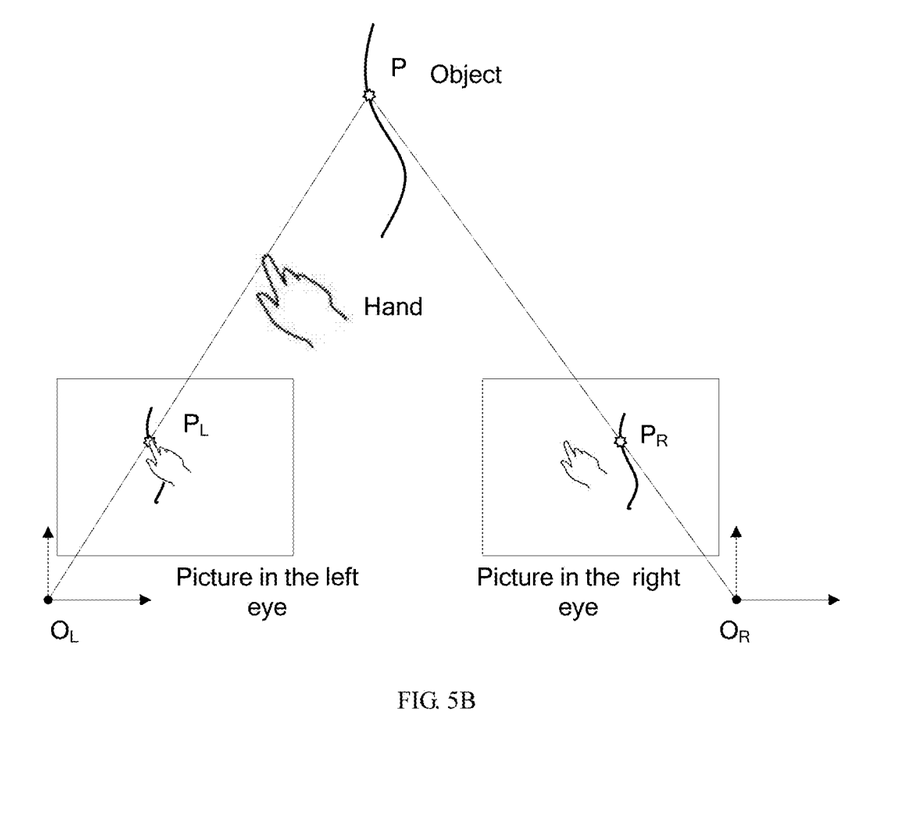

As shown in FIG. 5B, if a binocular browsing manner is selected, a processor 120 directly maps a key point on a gesture that is collected by the sensor 110 and that is included in image information displayed in the left eye to the to-be-measured object in the image information, obtains a measurement positioning point $P_L$, and obtains three-dimensional coordinate values (x, y, z) of a corresponding point P obtained after the measurement positioning point $P_L$ is mapped to the three-dimensional space. The three-dimensional coordinate values (x, y, z) of the point P are used for subsequent calculation of a measurement parameter value. In addition, based on a known parameter of structures of left and right eyes, the three-dimensional coordinate values (x, y, z) of the point P are mapped to image information that is collected by the sensor 110 and that is displayed in the right eye, so as to obtain a measurement positioning point $P_R$. Preferably, the measurement positioning points $P_L$ and $P_R$ are displayed in image information displayed in the left and the right eyes, so that the user correctly adjusts a position of the gesture.

Step 330: Determine a measurement parameter of the to-be-measured object.

A gesture type corresponding to the gesture is determined.

The preset correspondences between different gesture types and different measurement parameters are searched for a measurement parameter corresponding to the determined gesture type.

For example, in FIG. 4A, a measurement parameter that is of a gesture and that is for the to-be-measured cuboid object is a distance, where the distance may be a distance from the cuboid object to the image information collection device.

For another example, in FIG. 4B, a measurement parameter that is of a gesture and that is for the to-be-measured hollow cube object is a length between two measurement positioning points.

Step 340: Calculate a value of the measurement parameter of the to-be-measured object according to the determined measurement parameter and the three-dimensional coordinate values of the measurement positioning point.

For example, in FIG. 4A, an actual distance value from the cuboid object to the image information collection device is calculated according to the three-dimensional coordinate values of the determined measurement positioning point.

For another example, in FIG. 4B, a value of an actual length between the two measurement positioning points of the hollow cube object is calculated according to three-dimensional coordinate values of the two determined measurement positioning points.

In conclusion, according to a gesture-based object measurement method provided in Embodiment 1 of the present application, a gesture may be identified by defining a correspondence between a gesture type corresponding to a gesture and a measurement parameter; a key point on the gesture is mapped to a to-be-measured object in an image, so as to obtain a measurement positioning point; further, the measurement positioning point is mapped to an actual three-dimensional space scenario, so as to obtain three-dimensional coordinate values and perform calculation, which implements real-time online measurement, improves operation efficiency of AR measurement, and makes an operation process more visual and effective, so that a measurement process is closer to an intention of a user and more harmonious and natural, and the measurement process is not affected by a viewing angle change and is convenient and simple.

Embodiment 2

Figure 6:
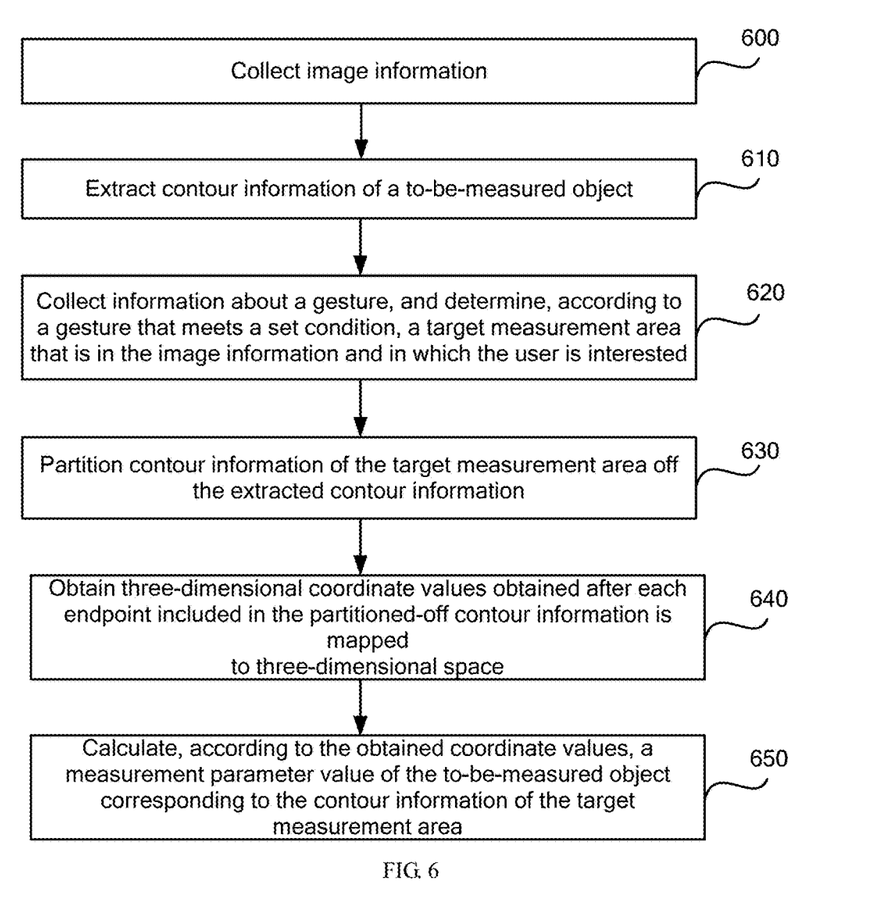
FIG. 6 is a flowchart of a measurement method according to Embodiment 2 of the present application.

Based on a concept in the method provided in Embodiment 1, another gesture-based object measurement method is provided in Embodiment 2 of the present application. As shown in FIG. 6, steps of the method include:

Step 600: Collect image information of a to-be-measured object.

Figure 7A:
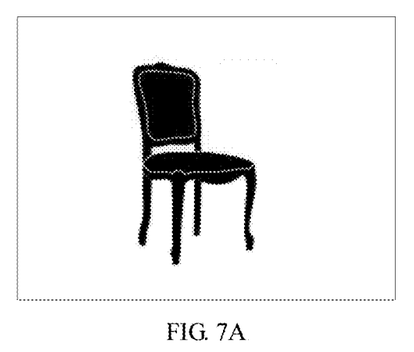
FIG. 7A and FIG. 7B are schematic diagrams of collected images according to Embodiment 2 of the present application.
Figure 7B:
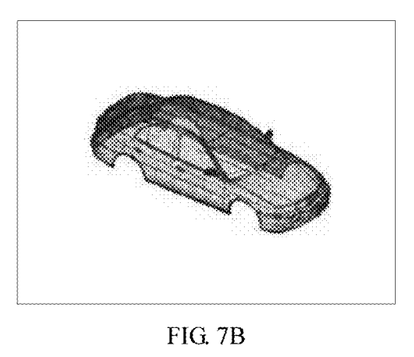

A color image or a depth image is collected by using an image information collection device. The collected color image is described by using a scenario example shown in FIG. 7A, and the collected depth image is described by using a scenario example shown in FIG. 7B. It should be noted that accompanying drawings of the present application do not present a color feature of the color image, which are shown by using black and white pictures.

Step 610: Extract contour information of the to-be-measured object from the collected image information.

Figure 8A:
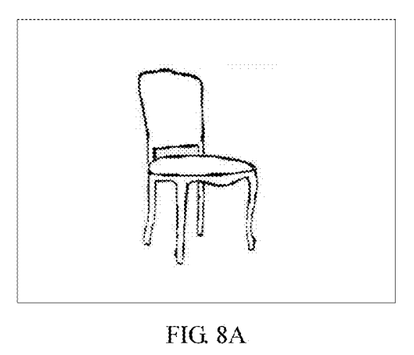
FIG. 8A and FIG. 8B are schematic diagrams of extracted contour information according to Embodiment 2 of the present application.
Figure 8B:
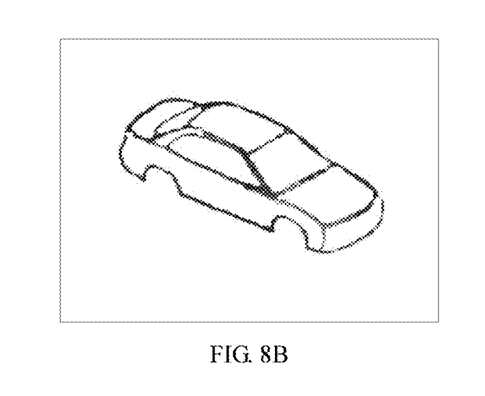

The contour information is edge information of the to-be-measured object. For example, the collected image information is a color image shown in FIG. 7A, and the extracted contour information is shown in FIG. 8A; for another example, the collected image information is a depth image shown in FIG. 7B, and the extracted contour information is shown in FIG. 8A.

Step 620: Collect information about a gesture, and when a collected gesture meets a set condition, determine, according to the gesture, a target measurement area that is in the image information and in which the user is interested.

Different from Embodiment 1, the gesture in Embodiment 2 may only include the first gesture type in Table 1, that is, a right index finger, and a key point set on the gesture is a vertex position of the right index finger.

The set condition is: (1) duration during which the gesture is located at a relative position in the image information exceeds a preset duration threshold; or (2) a distance of translating, by the gesture, in a direction perpendicular to a two-dimensional plane to which the image information is mapped exceeds a set step, where a relative position of the gesture remains unchanged in the translation process on the two-dimensional plane to which the image information is mapped.

Figure 9A:
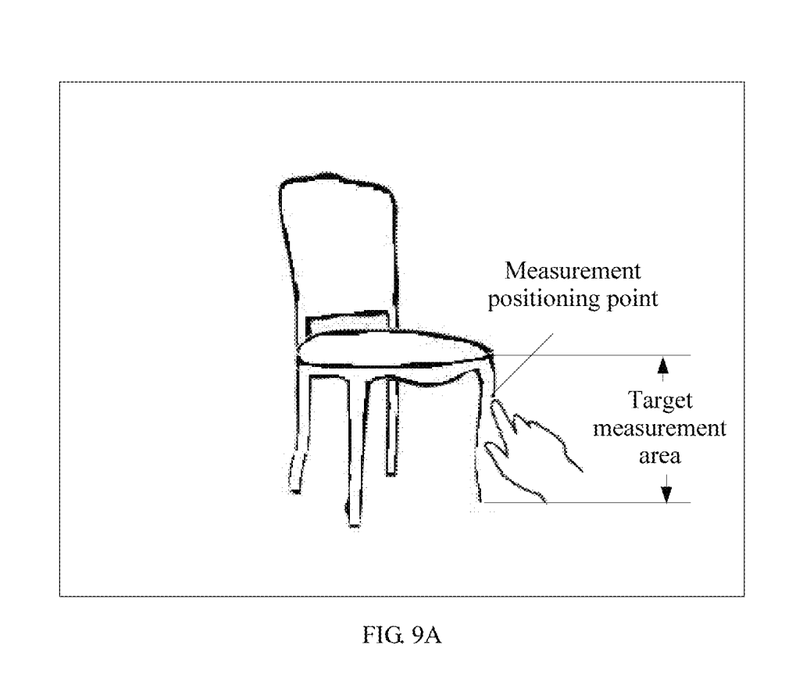
FIG. 9A and FIG. 9B are schematic diagrams of positioned target areas according to Embodiment 2 of the present application.
Figure 9B:
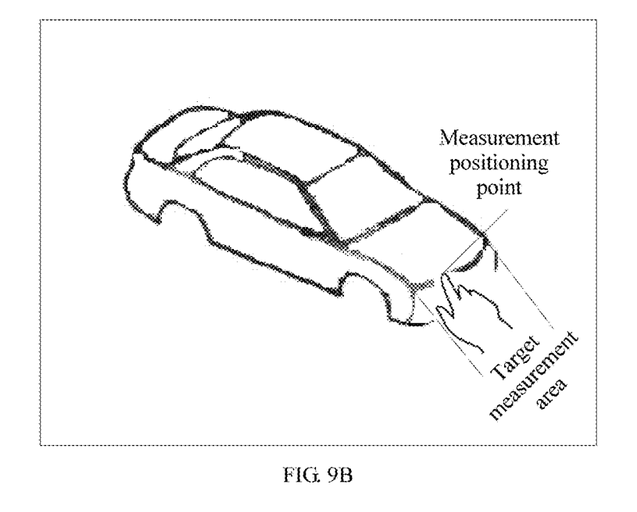

As shown in FIG. 9A or FIG. 9B, a position of the key point set on the gesture is mapped to the to-be-measured object in an image, so as to obtain a measurement positioning point, and an area in which the measurement positioning point is located is the target measurement area. The target measurement area is a measurement area corresponding to a to-be-measured object in which a user is interested.

Step 630: Partition contour information of the target measurement area off the extracted contour information.

The partitioned-off contour information of the target measurement area is contour information of the to-be-measured object in which the user is interested. The contour information includes some line segments formed by linking endpoints.

Figure 10A:
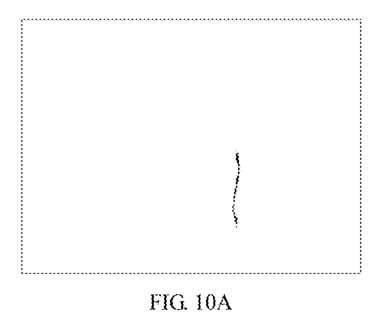
FIG. 10A and FIG. 10B are schematic diagrams of obtained contour information of target areas according to Embodiment 2 of the present application.
Figure 10B:
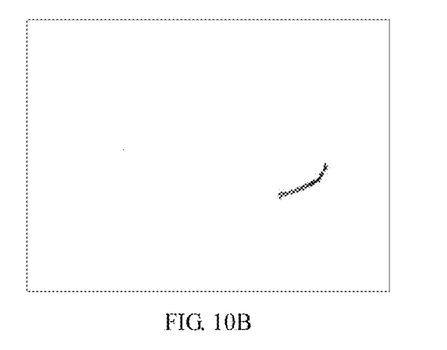

As shown in FIG. 10A, FIG. 10A shows partitioned-off contour information of an obtained target measurement area shown in FIG. 9A; as shown in FIG. 10B, FIG. 10B shows partitioned-off contour information of an obtained target measurement area shown in FIG. 9B.

Step 640: Obtain three-dimensional coordinate values obtained after each endpoint included in the partitioned-off contour information is mapped to three-dimensional space.

The three-dimensional coordinate values are coordinate values obtained after each endpoint is mapped to a three-dimensional space coordinate system.

Step 650: Calculate, according to the three-dimensional coordinate values, a measurement parameter value of the to-be-measured object corresponding to the contour information of the target measurement area.

The measurement parameter value includes at least one of a length value, an area value, a volume value, or a distance to the image information collection device, where the length value includes a length, a width, and a height.

A length between any two endpoints may be obtained by using coordinate values of each endpoint, and further, an area value, a volume value, and the like of the to-be-measured object are obtained.

Figure 11A:
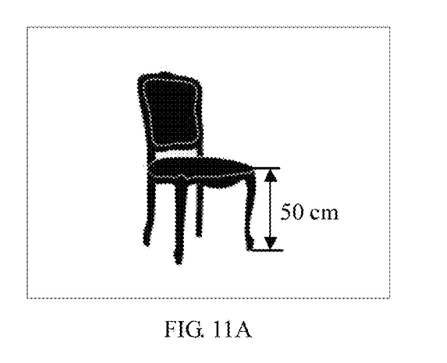
FIG. 11A and FIG. 11B are schematic diagrams of displayed measurement results according to Embodiment 2 of the present application.

A value of a length between two endpoints corresponding to the contour information that is of the target measurement area and that is shown in FIG. 10A is 50 centimeters (cm). The measurement parameter value of the to-be-measured object corresponding to the contour information of the target measurement area is a height value of a chair leg in the collected color image shown in FIG. 7A, the height value of the chair leg is 50 cm, and as shown in FIG. 11A, a measurement result is displayed.

Figure 11B:
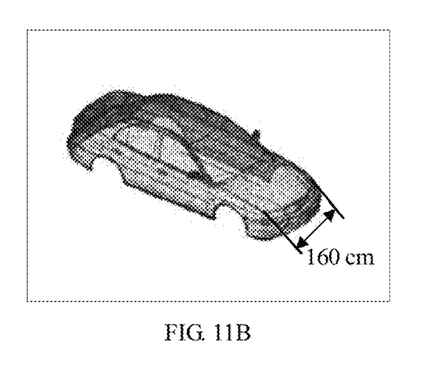

A value of a length between two endpoints corresponding to the contour information that is of the target measurement area and that is shown in FIG. 10B is 160 cm. The measurement parameter value of the to-be-measured object corresponding to the contour information of the target measurement area is a width value of a car head in the collected depth image shown in FIG. 7B, the width value of the car head is 160 cm, and as shown in FIG. 11B, a measurement result is displayed.

In Embodiment 2 of the present application, after image information is collected, contour information of a to-be-measured object is automatically extracted and partitioned off, and a measurement parameter value such as a length, an area, or a volume is calculated on this basis, which makes a measurement process simpler and more convenient, does not require the user to make various complex gestures, reduces impact on a measurement result that is brought by an error generated by multiple key points on a gesture, and makes a measurement result more accurate.

When a measurement apparatus 100 shown in FIG. 1 and provided in the present application executes the measurement method provided in Embodiment 1, a specific execution process of each part is described as follows: a sensor 110 is configured to collect image information of a to-be-measured object and information about a gesture; a processor 120 is configured to read a set of programs stored in a memory 150 and execute the following process: when the gesture collected by the sensor 110 meets a set condition, determining a measurement positioning point of the to-be-measured object according to the gesture; obtaining three-dimensional coordinate values obtained after the measurement positioning point is mapped to three-dimensional space; determining a measurement parameter of the to-be-measured object; and calculating a value of the measurement parameter of the to-be-measured object according to the measurement parameter and the three-dimensional coordinate values; a transceiver 130 is configured to send the value, obtained by means of calculation by the processor 120, of the measurement parameter to a display 140; and the display 140 is configured to display the received parameter value.

Preferably, that the gesture meets a set condition includes duration during which the gesture is located at a relative position in the image information exceeds a preset duration threshold.

Preferably, the processor 120 is configured to: determine a gesture type of the gesture; and search a preset correspondence between a gesture type and a measurement parameter for a measurement parameter corresponding to the determined gesture type, and use the measurement parameter as the measurement parameter of the to-be-measured object.

Preferably, the parameter includes at least one of a length, an area, a volume, or a distance to an image information collection device.

When a measurement apparatus 100 shown in FIG. 1 and provided in the present application executes the measurement method provided in Embodiment 2, a specific execution process of each part is described as follows: a sensor 110 is configured to collect image information of a to-be-measured object, and collect information about a gesture; a processor 120 is configured to read a set of programs stored in a memory 150 and execute the following process: extracting contour information of the to-be-measured object from the image information collected by the sensor 110; when the gesture collected by the sensor 110 meets a set condition, determining, according to the gesture, a target measurement area that is in the image information and in which the user is interested; partitioning contour information of the target measurement area off the extracted contour information; obtaining three-dimensional coordinate values obtained after each endpoint included in the partitioned-off contour information is mapped to three-dimensional space; and calculating, according to the obtained three-dimensional coordinate values, a measurement parameter value of the to-be-measured object corresponding to the contour information of the target measurement area; a transceiver 130 is configured to send the measurement parameter value obtained by means of calculation by the processor 120 to a display 140; and the display 140 is configured to display the received measurement parameter value.

Preferably, that the gesture meets a set condition includes: duration during which the gesture is located at a relative position in the image information exceeds a preset duration threshold; or a distance of translating, by the gesture, in a direction perpendicular to a two-dimensional plane to which the image information is mapped exceeds a set step, where a relative position of the gesture remains unchanged in the translation process on the two-dimensional plane to which the image information is mapped.

Preferably, the measurement parameter value includes at least one of a length value, an area value, a volume value, or a distance to an image information collection device.

Now a description of the gesture-based object measurement method and apparatus provided in the present application is completed.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the scope of the embodiments of the present disclosure. The present disclosure is intended to cover these modifications and variations provided that they fall within the scope of protection defined by the following claims and their equivalent technologies.

What is claimed is:

1. A gesture-based object measurement method, comprising:
    collecting image information of a to-be-measured object and a gesture;
    extracting contour information of the to-be-measured object from the collected image information;
    determining, according to the gesture, a target measurement area that is in the image information and in which the user is interested when the gesture meets a set condition;
    partitioning contour information of the target measurement area off the extracted contour information;
    obtaining three-dimensional coordinate values obtained after each endpoint comprised in the partitioned-off contour information is mapped to three-dimensional space; and
    calculating, according to the obtained three-dimensional coordinate values, a measurement parameter value of the to-be-measured object corresponding to the contour information of the target measurement area.

2. The method according to claim 1, wherein the gesture meets a set condition when a duration during which the gesture is held at a relative position in the image information exceeds a preset duration threshold.

3. The method according to claim 1, wherein the gesture meets a set condition when a distance in which the gesture is translated in a direction perpendicular to a two-dimensional plane to which the image information is mapped exceeds a set step, and a relative position of the gesture remains unchanged in the translation process on the two-dimensional plane to which the image information is mapped.

4. The method according to claim 1, wherein the measurement parameter value comprises at least one of a length value, an area value, a volume value, or a distance to an image information collection device.

5. The method according to claim 1, further comprising:
    determining a gesture type of the gesture;
    searching a preset correspondence between a gesture type and a measurement parameter for a measurement parameter corresponding to the determined gesture type; and
    using the measurement parameter in calculating the measurement parameter value.

6. The method according to claim 1, further comprising displaying the measurement parameter value.

7. A gesture-based object measurement apparatus, comprising:
    a display;
    a sensor configured to collect image information of a to-be-measured object and a gesture;
    a processor coupled to the sensor and configured to:
        determine a measurement positioning point of the to-be-measured object according to the gesture when the gesture collected by the sensor meets a set condition;
        obtain three-dimensional coordinate values obtained after the measurement positioning point is mapped to three-dimensional space;
        determine a measurement parameter of the to-be-measured object; and
        calculate a value of the measurement parameter of the to-be-measured object according to the measurement parameter and the three-dimensional coordinate values; and
    a transceiver coupled to the processor and configured to send the value of the measurement parameter to the display, the display being configured to display the received parameter value.

8. The apparatus according to claim 7, wherein the processor is further configured to:
    determine a gesture type of the gesture;
    search a preset correspondence between a gesture type and a measurement parameter for a measurement parameter corresponding to the determined gesture type; and
    use the measurement parameter as the measurement parameter of the to-be-measured object.

9. The apparatus according to claim 7, wherein the gesture meets a set condition when a duration during which the gesture is held at a relative position in the image information exceeds a preset duration threshold.

10. The apparatus according to claim 7, further comprising a memory configured to store the programs executed by the processor.

11. The apparatus according to claim 7, wherein the measurement parameter value comprises at least one of a length value, an area value, a volume value, or a distance to an image information collection device.

12. The apparatus according to claim 7, wherein the gesture meets a set condition when a distance in which the gesture is translated in a direction perpendicular to a two-dimensional plane to which the image information is mapped exceeds a set step, and a relative position of the gesture remains unchanged in the translation process on the two-dimensional plane to which the image information is mapped.

13. The apparatus according to claim 7, further comprising a wearable device comprising the display and the sensor.

14. A gesture-based object measurement apparatus, comprising:
    a display;
    a sensor configured to:
        collect image information of a to-be-measured object and a gesture,
    a processor coupled to the sensor and configured to:
        extract contour information of the to-be-measured object from the image information collected by the sensor;
        determine, according to the gesture, a target measurement area that is in the image information and in which the user is interested when the gesture collected by the sensor meets a set condition;
        partition contour information of the target measurement area off the extracted contour information;
        obtain three-dimensional coordinate values obtained after each endpoint comprised in the partitioned-off contour information is mapped to three-dimensional space; and calculate, according to the obtained three-dimensional coordinate values, a measurement parameter value of the to-be-measured object corresponding to the contour information of the target measurement area; and a transceiver coupled to the processor and configured to send the measurement parameter value to the display, the display being configured to display the received measurement parameter value.

15. The apparatus according to claim 14, wherein the gesture meets a set condition when a duration during which the gesture is held at a relative position in the image information exceeds a preset duration threshold.

16. The apparatus according to claim 14, wherein the gesture meets a set condition when a distance in which the gesture is translated in a direction perpendicular to a two-dimensional plane to which the image information is mapped exceeds a set step, and a relative position of the gesture remains unchanged in the translation process on the two-dimensional plane to which the image information is mapped.

17. The apparatus according to claim 14, further comprising a memory, configured to store the programs executed by the processor.

18. The apparatus according to claim 14, wherein the gesture meets a set condition when a duration during which the gesture is held at a relative position in the image information exceeds a preset duration threshold.

19. The apparatus according to claim 14, wherein the measurement parameter value comprises at least one of a length value, an area value, a volume value, or a distance to an image information collection device.

20. The apparatus according to claim 14, further comprising a wearable device comprising the display and the sensor.

* * * * *